(No Model.) 4 Sheets—Sheet 1.
C. ANDERSON.
GANG PLOW.
No. 468,021. Patented Feb. 2, 1892.
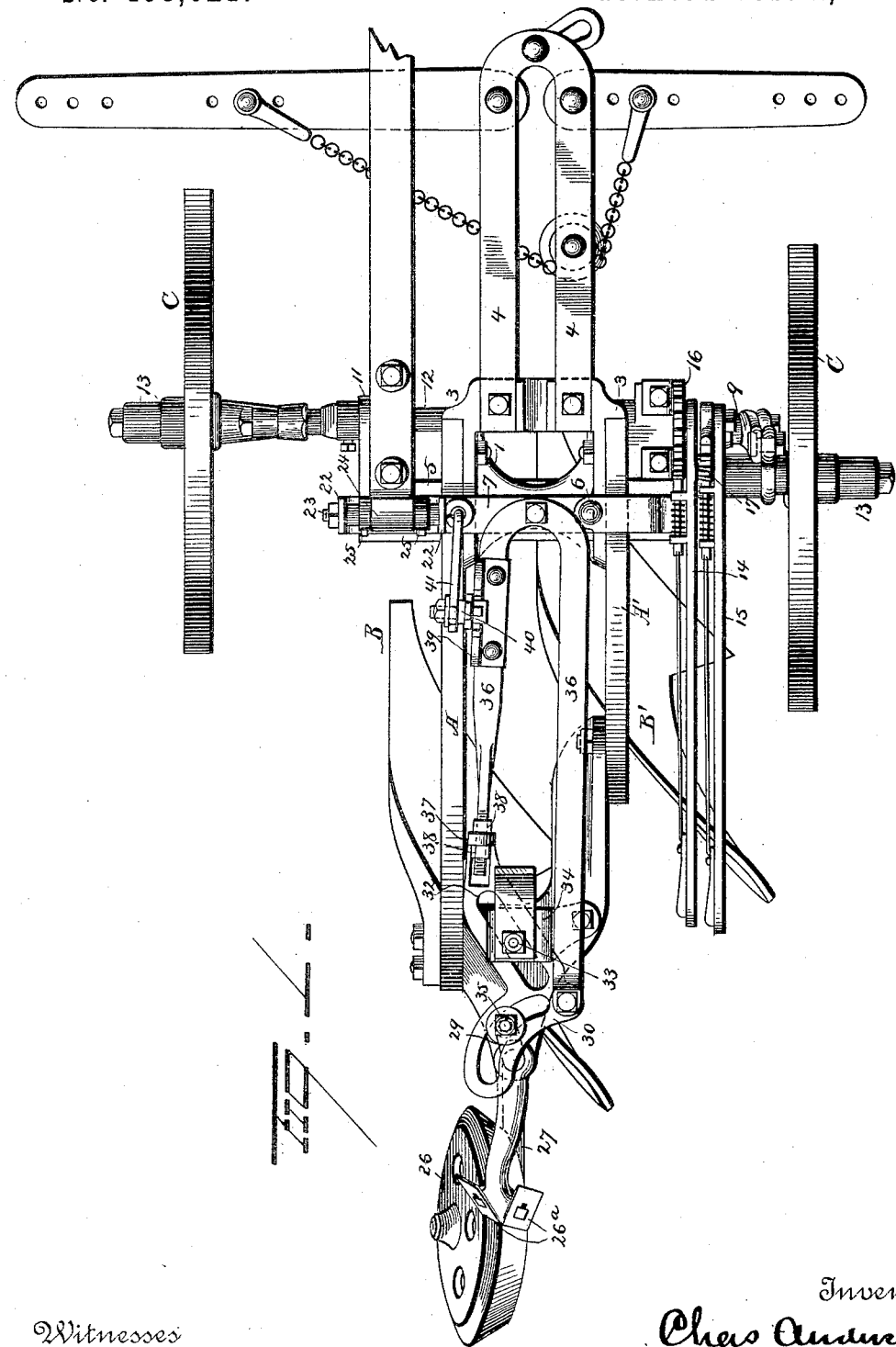
Witnesses
E. J. Nottingham
G. F. Downing
Inventor
Chas Anderson
By H. A. Symmon
Attorney

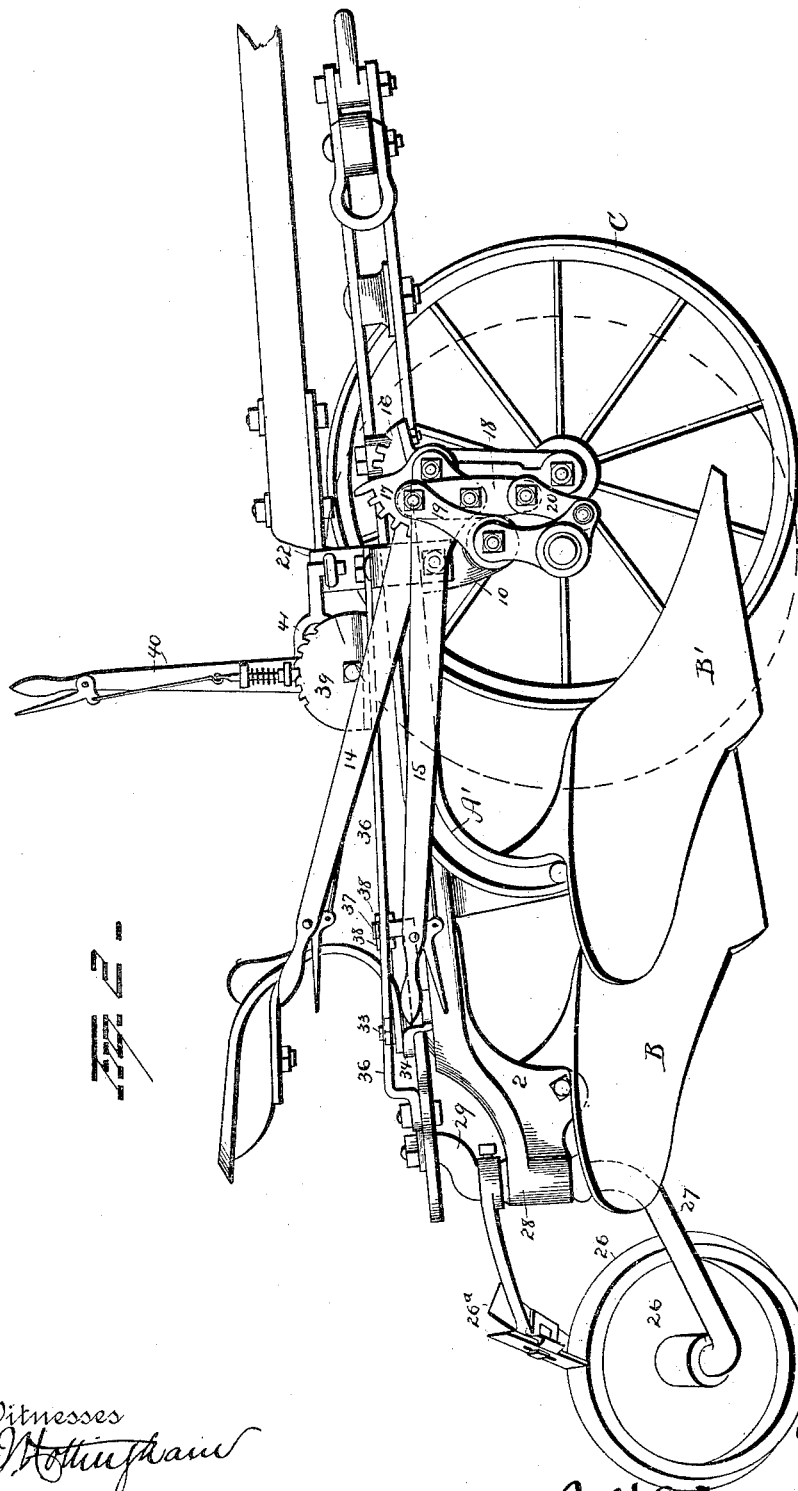

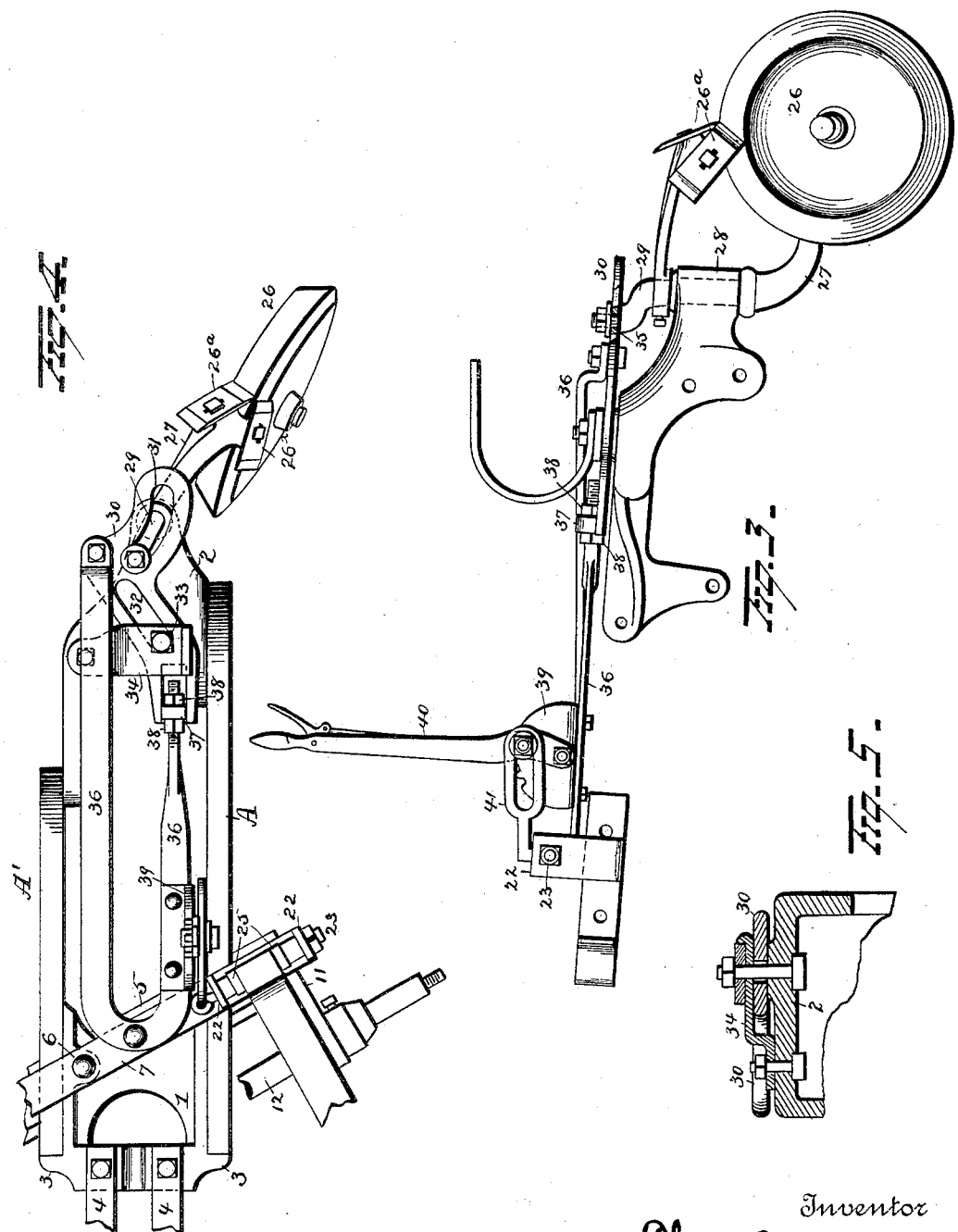

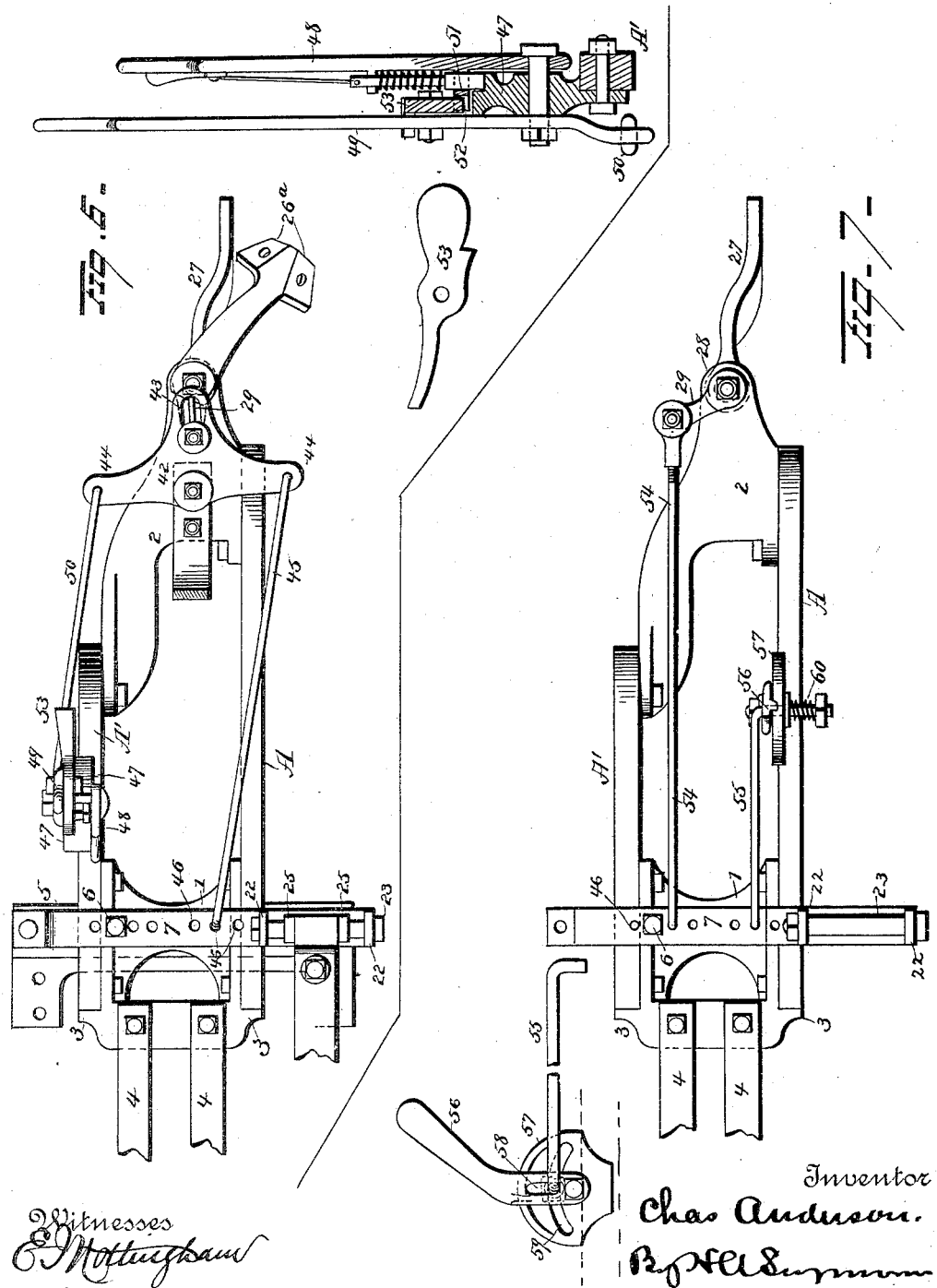

UNITED STATES PATENT OFFICE.

CHARLES ANDERSON, OF SOUTH BEND, INDIANA, ASSIGNOR TO THE SOUTH BEND IRON WORKS, OF SAME PLACE.

GANG-PLOW.

SPECIFICATION forming part of Letters Patent No. 468,021, dated February 2, 1892.

Application filed January 30, 1891. Serial No. 379,648. (No model.)

*To all whom it may concern:*

Be it known that I, CHARLES ANDERSON, of South Bend, in the county of St. Joseph and State of Indiana, have invented certain new and useful Improvements in Gang-Plows; and I do hereby declare the following to be a full, clear, and exact description of the invention, such as will enable others skilled in the art to which it appertains to make and use the same.

My invention relates to an improvement in gang-plows, the primary object being to keep the furrow-wheel snug against the wall of the furrow when turning a square corner without changing the width or depth of the furrow.

A further object is to make provision for turning corners, whereby the parts will shift themselves automatically; and still further objects are to provide for regulating the depth and width of cut of furrows, for shifting the tongue laterally, and for economizing and reducing the number of parts and disposing them in convenient positions.

With these ends in view my invention consists in certain novel features of construction and combinations of parts, as will be hereinafter described, and pointed out in the claims.

In the accompanying drawings, Figure 1 is a plan view of my improved gang-plow, showing the most approved form. Figs. 2 and 3 are right and left side elevations. Figs. 4 and 5 are detail views, and Figs. 6 and 7 are views of modifications.

A A' represent the two beams of the plow, and B B' are the plows, secured, respectively, to these beams. The beams are held apart a suitable distance by spacing-brackets 1 and 2 at their forward and rear ends, respectively, as shown in Fig. 1, when the two plows are used. In this connection it may be stated that while the plow shown and described is what is known as a "sulky-plow," it is obvious that one plow might be used with the other parts of the present invention with trifling alterations and without changing the essential features of the invention.

The bracket 1 at the forward end is securely bolted at its sides to the ends of the plow-beams, and it is preferably constructed with lateral projections 3 3, which lap over the ends of the beams, as shown in Fig. 1. This bracket is also provided with recesses or seats for the attachment of the draft-rods 4 4, with which the eveners are connected.

An axle 5 supports the forward ends of the beams, and they are pivotally connected with the axle by means of a king-bolt 6. A saddle 7 passes over the beams and bracket 1 and is secured at its ends to the axle. The king-bolt 6 passes through holes in the saddle, bracket, and axle to hold the parts pivotally together. The axle and the saddle are provided with a series of holes to receive the king-bolt and permit a lateral shifting of the axle relative to the beams, so as to regulate the width of the furrow.

The axle is provided at one end with a downwardly and forwardly projecting skein 9, and on this a thimble 10 is loosely mounted. The thimble has a skein integral therewith, and this is supported loosely in one of the ground-wheels C. In forwardly-projecting arms 11 11 on the axle a rocking shaft 12 is loosely supported. This shaft is provided at one end with a skein 13, which extends into the other ground-wheel C. On its opposite end this shaft is provided with a pair of hand-levers 14 and 15, one being secured thereon and the other mounted loose. These levers are provided with the usual spring-latches adapted to engage the teeth of segments 16 and 17, secured, respectively, on the axle and on lever 14. These levers are substantially the same as those shown in my former patents, and therefore require no further description, except to add that the lever 14 operates to swing both skeins, one forward and the other backward, to raise and lower the plows, and the other lever to regulate the furrow-wheel, and this latter movement is effected by means of an arm 18, which is pivoted at or near its center to a lateral projection on lever 15 and which is pivotally connected at each end with links 19 and 20, which in turn are pivotally connected at two different points with the thimble 10. By this means perfect control is had over this wheel, and by the particular leverage described the manipulation of the wheel is rendered easy.

A pair of upright arms 22 22 project upwardly from the saddle conveniently at or near one end thereof and a bolt 23 is passed through them. On this bolt the rear end of the tongue is pivotally supported. The length of this bolt is intentionally greater than the width of the tongue, so as to admit of the latter being shifted laterally thereon. A pair of collars 24 24 are secured on the bolt on either side of the tongue by set-screws 25 25 to hold the tongue in its lateral adjustment. The plow is turned by this tongue, the truck and caster-wheel turning automatically when the team is turned to the left, as is of course ordinarily the case in plowing. By this means the necessity of a jointed tongue is obviated.

At the rear end of the spacing-bracket 2 the caster-wheel 26 is loosely supported. The wheel 26 is supported on the outside of stem or on the landside, the object being to leave the outside plain and smooth, and thus prevent the accumulation of trash when plowing. A wheel-scraper 26ª is supported on the caster-wheel stem. The stem 27 of this wheel extends through a box 28, formed in the bracket to receive it, and the stem terminates in a forwardly and laterally extending crank-arm 29. Connected with the latter is a slotted plate 30. This plate has a loose sliding connection with the crank-arm 29 and also with the bracket 2. The crank-arm operates in a curved slot 31 in the rear end of the plate, this slot being formed approximately in the arc of a circle whose center is the axis of the stem 27. In order to lessen friction, the crank-arm is provided with an anti-friction roller, which bears inside of the slot. The plate 30 is also provided with a diagonal slot 32, and through this slot a bolt 33 passes, said bolt also extending through the bracket 2 and through an arm 34 over the plate, and this same bolt also secures the seat in place on the bracket 2. An anti-friction roller 35 on this bolt operates within the diagonal slot and prevents friction. The result gained by having the slotted device herein mentioned is that by its action I am enabled to turn both to the right and left with the greatest ease possible. In turning to the left on a right-hand plow the plow works automatically; but in turning to the right a lever, which will be described, must be pushed forward.

A U-shaped connecting-bar 36 is pivotally connected to the saddle-bar at about its center and at its ends to the slotted plate. One end of this bar is preferably longer than the other and is pivotally connected to the slotted plate. The other end is screw-threaded and extends through a lug 37, and a pair of nuts 38 38 are arranged on either side of the lug, by which to regulate the tension of the caster-wheel and overcome any variations in parts and possible irregularities in setting up or wear of parts when in use.

On the outer side of the U-shaped connecting-bar is placed a ratchet-sector 39. A lever 40 is pivoted to this sector and provided with the usual spring-latch, which operates in connection with the teeth of the sector. A slotted link 41, with a hook on one end of it, connects this lever loosely with the eyebolt 23, which passes through the tongue-bearing. In straightening up the plow from a turn to the left it resumes its normal position without any effort of the driver; but when a turn is made to the right it only partially does this, and slight assistance from the driver is needed to replace the lever in proper position.

In the modification shown in Fig. 6 a yoke 42 is pivotally supported on the spacing-bracket 2, and this yoke is provided with an elongated cam-slot 43, in which the crank-arm 29 plays. The yoke is furnished with two oppositely-projecting arms 44 44. A connecting-rod 45 extends from one of these arms forwardly to the saddle, with which it may be connected at different points by entering any of the holes 46 46, so that the truck and caster-wheel operate simultaneously, whereby the relative swings of the two can be readily varied. The object of this construction is to attain a finer adjustment of the truck-wheels and caster-wheel than heretofore. As thus constructed the three wheels work together and throw the plows in or out of the land with perfect accuracy. Owing to there being no landsides on the plow-bottoms, the pressure on the mold-boards and caster-wheel would in heavy plowing be very great, and by this new method of attachment this pressure is overcome or regulated so as not to be noticeable. On the outside or furrow-beam a toothed sector 47 is stationed, and with this sector are connected a pair of levers 48 and 49, one being, for convenience, located on each side thereof. These may be the ordinary levers, if desired, conveniently supported on a common axle and provided with dogs to engage the teeth on the sector, and springs and latches by which these dogs are controlled. One lever, the outer one, preferably, is extended a short distance below its axle and has connected therewith a connecting-rod 50, which extends back to one of the arms 44 on the yoke. By means of these two levers the truck and caster are swung and controlled, and before entering into a description of the operation I desire to advert to a slight detail in the construction which I generally prefer to use in making these plows. The lever 48 is provided with an outwardly-projecting lug 51, in which a notch 52 is formed, and a gravity pawl 53 on the other lever 49 is adapted to engage this notch. This pawl is weighted at one end and furnished with a tread at the rear end, by which it can be easily operated by the driver with his foot. The outer lever is used to hold or lock the truck rigidly when plowing. The inner lever is used to set the truck up to or away from the land. The dog attached to the other lever is so formed as to allow the plow to turn to the left automatically, and to lock it against turning to the right without first raising the dog out of the notch. When running straight again, the dog re-engages the notch automatically; but after turning to the right, which is seldom necessary, the lever must be drawn back by hand to permit the dog to reengage.

In the modification shown in Fig. 7 the crank-arm 29 projects laterally, and a rod 54 extends directly from it to one of the holes in the saddle. Connected, also, with this saddle and axle is a rod 55. This, too, may be connected to the saddle at different points by entering any one of the holes 46 46. This rod extends back to a hand-lever 56, the latter being pivoted to a segment 57 on one of the plow-beams. The hand-lever is provided with an elongated slot 58 and the segment with a curved slot 59, through which the rear end of the rod 55 extends loosely. Said rear end is bent laterally and has mounted thereon a spring 60 and a nut at the end, by means of which the lever is held normally in engagement with the segment. The lever has a tooth on one side and the segment a notch in which the tooth is held normally, or while the plow moves forward; but the rear edge of this notch is beveled, so that a slight backward pressure upon the lever from a turn by the team to the left causes the lever to become disengaged, whereby the truck may easily turn and the caster-wheel also form its connection with the truck. This provision is only made for turns to the left, as almost all plowing is done in this way. To turn or release the parts to allow them to turn the other way, it is necessary for the driver to push the lever forward.

It is evident that slight changes might be resorted to in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. In a gang-plow, the combination, with a swinging axle-frame and wheels at the opposite ends thereof adapted to swing therewith, and a draft attachment connected with this frame, whereby it is turned by the draft applied to it, of a pivoted caster-wheel and means connecting the latter with the axle-frame, whereby the two are turned simultaneously, substantially as set forth.

2. In a plow, the combination, with a truck and plow-beam, of a caster-wheel, means for connecting the latter with the axle, ground-wheels, and a lever for locking the wheels against swinging laterally in one direction without preventing their swinging in opposite directions from a lateral pull on the plow, substantially as set forth.

3. The combination, with a truck and beam, of a caster-wheel, means for connecting the latter to the axle, ground-wheels, means for locking the wheels against a lateral swing in one direction, a tongue connected with the truck, and means for allowing a lateral turn of the trucks and caster-wheel in the opposite direction by a lateral pressure upon the tongue, substantially as set forth.

4. The combination, with an axle, plow beam or beams, caster-wheel, and a rod or bar connecting the latter with the axle, of a lever connected with the axle and the caster-wheel, substantially as set forth.

5. The combination, with an axle, plow beam or beams, caster-wheel, and a rod or bar connecting the latter with the axle, of a toothed segment, a lever pivoted in proximity to the segment and having means for engaging the segment, a rod extending from this lever to the axle, and means for retaining the lever normally in engagement with the segment, substantially as set forth.

6. The combination, with a beam or beams, of an axle pivotally connected with the beam or beams, a lever, a rod or bar connecting the latter with the beam or beams, and mechanism with which the lever co-operates for confining the lateral swing of the axle to one direction, substantially as set forth.

7. The combination, with two or more plow-beams and spacing-brackets secured to the beams for holding them rigidly apart, of a laterally-movable truck and caster-wheel and means for connecting said parts, whereby they move together laterally, substantially as set forth.

8. The combination, with an axle-frame provided with lateral projections, of a rod or bolt passing through these projections, said rod or bolt being of greater length than the width of the tongue and adapted to support the latter, and collars adjustably secured on the rod or bolt and adapted to be set to hold the tongue in various lateral positions, substantially as set forth.

9. In a plow, the combination, with a beam, axle, and caster-wheel, of a loosely-supported slotted plate having loose connection with the caster-wheel, and means for connecting said plate and axle together, substantially as set forth.

10. In a plow, the combination, with a beam or beams, axle, and caster-wheel, of a slotted plate loosely connected with the frame of the plow and with which the caster-wheel has loose connection, a connecting-bar extending from the plate to the axle, and a lever pivotally connected with the bar and loosely connected with the axle, substantially as set forth.

11. In a plow, the combination, with a beam or beams, axle, caster-wheel, and a slotted plate, of an approximately U-shaped connecting-bar pivotally connected at one end with the slotted plate and adjustably connected with the latter at the other end and pivotally connected with the axle at the bend, substantially as set forth.

12. In a plow, the combination, with a beam or beams, axle, caster-wheel, slotted plate, and a U-shaped connecting-bar, of a lever pivotally connected with said bar and loosely connected with the axle, substantially as set forth.

13. The combination, with a plow-frame and caster-wheel, of a plate having an oblique slot therein which receives a bolt, whereby the plate has a sliding and lateral movement on the frame, said plate also provided with a curved slot in which a crank-arm of the caster-wheel operates, said crank-arm and bolt having anti-friction rollers thereon which operate in the slot, substantially as set forth.

14. The combination, with the frame of a plow and caster-wheel, of an axle, a connecting-bar, a toothed segment, a lever pivoted to the latter, and a slotted link having a hook on one end connecting said lever and axle, substantially as set forth.

15. In a plow, the combination, with a beam, axle, and caster-wheel, of a slotted plate loosely connected with the plow-frame and with which the caster-wheel has loose connection, and a connecting-bar extending from the plate to the axle, substantially as set forth.

In testimony whereof I have signed this specification in the presence of two subscribing witnesses.

CHARLES ANDERSON.

Witnesses:
F. C. NIPPOLD,
J. T. WALKER.